United States Patent
McQuiggan

(10) Patent No.: US 7,706,657 B1
(45) Date of Patent: Apr. 27, 2010

(54) FIBER OPTIC PARKING DUST COVER

(75) Inventor: Michael R. McQuiggan, Goleta, CA (US)

(73) Assignee: Occam Networks, Inc., Santa Barbara, CA (US)

( * ) Notice: Subject to any disclaimer, the term of this patent is extended or adjusted under 35 U.S.C. 154(b) by 0 days.

(21) Appl. No.: 12/347,906

(22) Filed: Dec. 31, 2008

(51) Int. Cl.
G02B 6/00 (2006.01)

(52) U.S. Cl. ............... 385/139; 385/134; 433/135; 433/136; 433/147

(58) Field of Classification Search ............ 385/139; 439/135, 136, 147
See application file for complete search history.

(56) References Cited

U.S. PATENT DOCUMENTS

| | | | | |
|---|---|---|---|---|
| 6,104,856 | A * | 8/2000 | Lampert | 385/140 |
| 6,108,482 | A * | 8/2000 | Roth | 385/139 |
| 6,154,597 | A * | 11/2000 | Roth | 385/139 |
| 6,692,159 | B2 * | 2/2004 | Chiu et al. | 385/53 |
| 6,832,856 | B2 * | 12/2004 | Chiu et al. | 385/53 |
| 6,863,448 | B2 * | 3/2005 | Chiu et al. | 385/88 |
| 6,916,196 | B2 * | 7/2005 | Long et al. | 439/352 |
| 7,255,490 | B2 * | 8/2007 | Zhang et al. | 385/88 |
| 7,287,916 | B2 * | 10/2007 | Mizue | 385/92 |
| 7,307,847 | B2 * | 12/2007 | Torres et al. | 361/730 |
| 7,350,984 | B1 * | 4/2008 | Togami et al. | 385/89 |
| 7,448,810 | B2 * | 11/2008 | Ko | 385/92 |
| 2007/0066248 | A1 * | 3/2007 | Ka | 455/90.3 |

OTHER PUBLICATIONS

"Small Form-Factor Pluggable Transceiver", Wikipedia, http://en.wikipedia.org/wiki/SC_connector, downloaded on May 30, 2008, 2 pages.

"Optical Fiber Connector", Wikipedia, http://en.wikipedia.org/wiki/SFP_Transceiver, downloaded on Oct. 2, 2008, 4 pages.

"Small Form Factor Pluggable (SFP) Cage", DM7034, New Product Development, http://ireland.methode.com/New/DM7034.htm, downloaded on Dec. 30, 2008, 3 pages.

* cited by examiner

*Primary Examiner*—Ryan Lepisto
(74) *Attorney, Agent, or Firm*—Blakely, Sokoloff, Taylor & Zafman LLP

(57) ABSTRACT

A cover is described that includes an opening for the cover to receive a latch of a pluggable device to secure the pluggable device in the cover. The cover includes a retaining latch for the cover to hold the cover within an opening of a device. The cover, when inserted into the opening of the device, provides dust protection for the opening of the device and a parking location for the pluggable device. A method is also described for parking a fiber optic connector in a cover and latching the cover into a cage of a communications device.

20 Claims, 6 Drawing Sheets

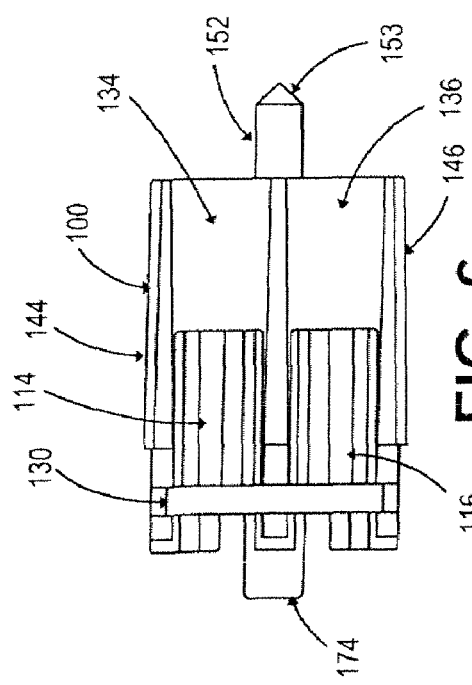
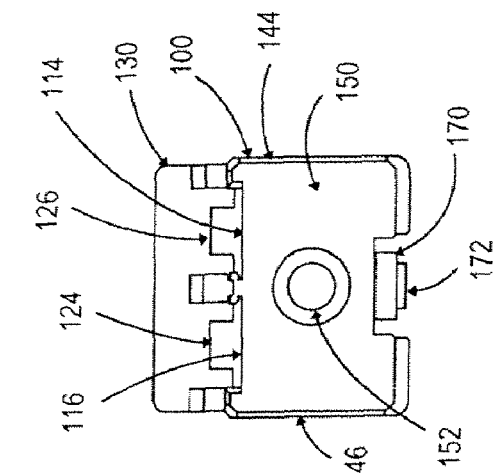
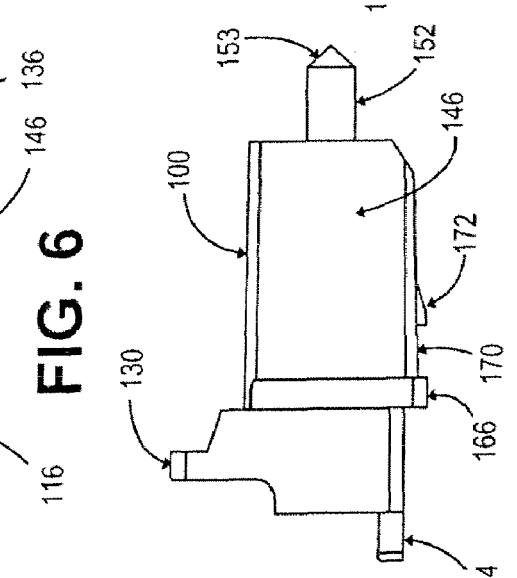
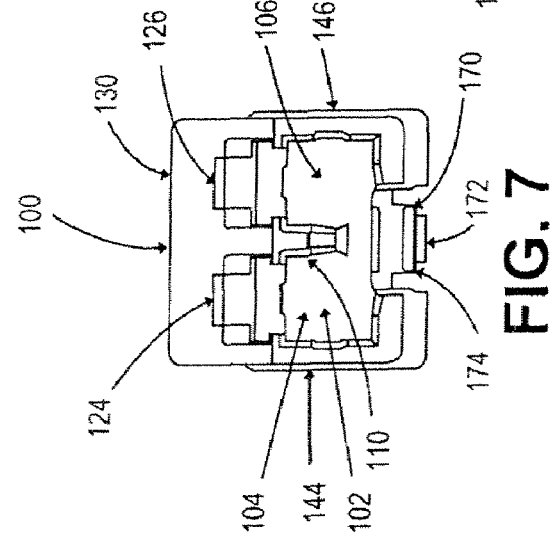

FIBER OPTIC PARKING DUST COVER

FIELD

Embodiments of the present invention relate to fiber optic communications equipment and accessories. In particular, embodiments of the present invention relate to a cover for a small form-factor pluggable (SFP) cage of a telecommunications or data communications device, wherein the cover functions as a dust cover for the SFP cage and also as a parking location for unused fiber optic cables.

BACKGROUND

FIG. 1 shows a prior art small form-factor pluggable (SFP) compact optical transceiver 10 that is used for optical communications. The SFP transceiver 10 can be used for telecommunications and data communications applications. The first end 12 the SFP transceiver 10 has two openings 16 and 18 for receiving optical ends 26 and 28 of a duplex LC fiber optic connector 30 connected to a fiber optic networking cable 34. Opening 16 includes a receiver of optical signals and the other opening 18 includes a transmitter of optical signals.

Termination covers 36 and 38 are shown in FIG. 1. Termination covers 36 and 38 are used to cover respective termination points 56 and 58 of respective optical ends 26 and 28 of duplex LC fiber optic connector 30.

A prior art dust cover 40 can be placed in openings 16 and 18 of SFP transceiver 10 when optical ends 26 and 28 of duplex LC fiber optic connector 30 are not placed in openings 16 and 18. Prior art dust cover 40 helps to keep dust and debris from entering openings 16 and 18.

FIG. 2 shows SFP transceiver 10 in an inverted position. The back end 42 of transceiver 10 is shown. Connector 40 provides an electrical connection between transceiver 10 and a communications switch or router.

FIG. 3 shows transceiver 10 inserted into SFP cage 46 of gigabit switch 50, which is a port of the gigabit switch 50. Optical ends 26 and 28 of duplex LC fiber optic connector 30 are inserted into openings 16 and 18 of transceiver 10. An electrical connector at the internal end of SFP cage 46 allows connector 40 of transceiver 10 to electrically couple with an internal motherboard (not shown) of switch 50. FIG. 3 also shows another SFP transceiver 12 inserted into SFP cage 48 of switch 50, which is another port of switch 50.

One disadvantage of prior art cable and switch systems is the difficulty in handling unconnected fiber optic cables. Numerous unconnected fiber optic cables can be hard to keep track of.

Sometimes fiber optic connector ends of cables are temporarily placed or parked in unused SFP cages or ports, such as SFP cage 62 of FIG. 3 that does not contain a transceiver. Nevertheless, such fiber optic connector ends only loosely reside in such unused SFP cages, given that the SFP cages typically are much larger than the fiber optic connector ends. This means that the fiber optic connector ends can be easily dislodged from the unused SFP cages.

SUMMARY

A cover is described that includes an opening for the cover to receive a latch of a pluggable device to secure the pluggable device in the cover. The cover includes a retaining latch for the cover to hold the cover within an opening of a device. The cover, when inserted into the opening of the device, provides dust protection for the opening of the device and a parking location for the pluggable device.

A method is also described for parking a fiber optic connector in a cover by latching the fiber optic connector into the cover. The cover is latched into the cage of a communications device to provide dust protection for the cage. When the fiber optic connector is parked in the latched cover, the latched cover cannot be removed from the cage.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements.

FIG. 6 is a top view of the dust cover.

FIG. 7 is a front view of the dust cover.

FIG. 8 is a right-side view of the dust cover.

FIG. 9 is a back view of the dust cover.

DETAILED DESCRIPTION

An embodiment of the present invention is a cover that helps to shield and protect an unused SFP cage of a telecommunications switch from dust. When the dust cover is placed in the SFP cage, the dust cover also serves as a place to park or store one or more fiber optic connectors for fiber optic cabling. Alternatively, the dust cover can be designed to park or store electrical connectors for twisted pair or other types of cabling for communications.

Figure 1:
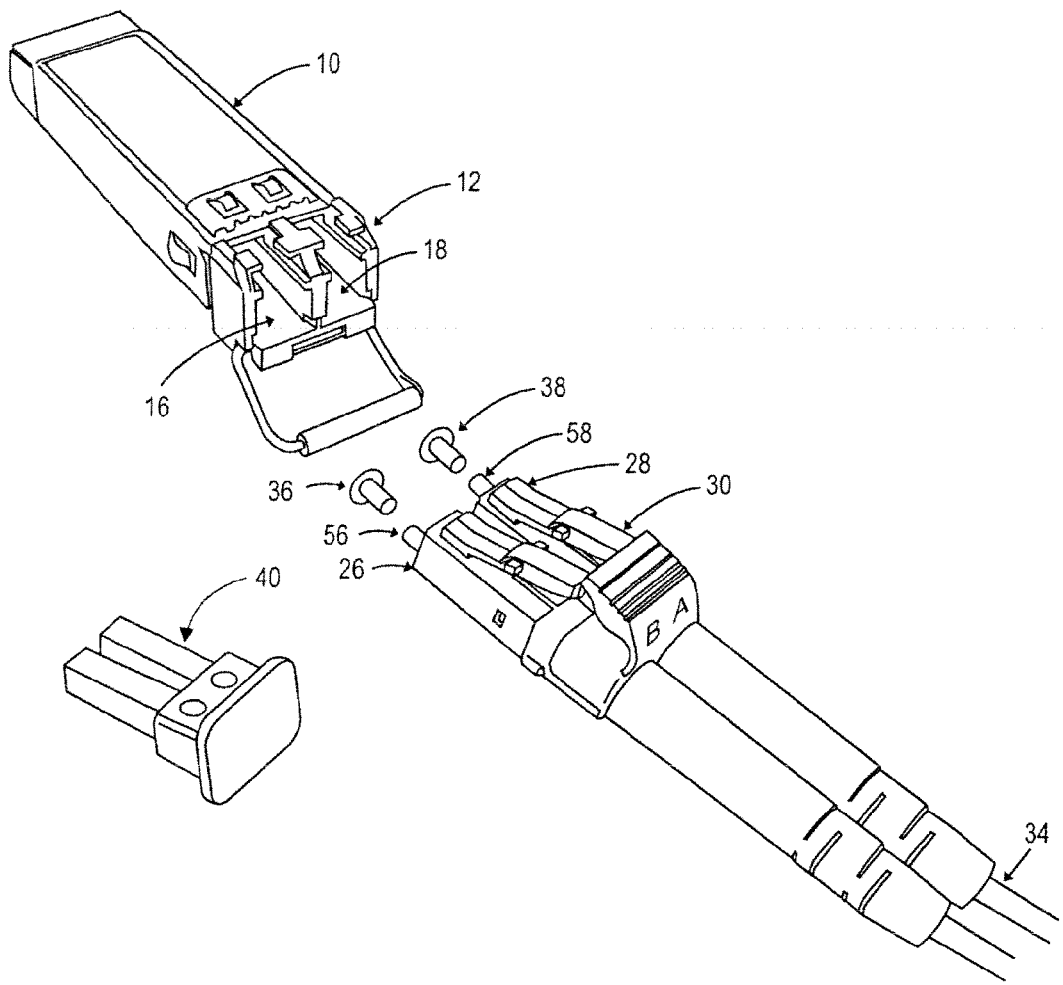
FIG. 1 illustrates a prior art transceiver, a prior art fiber optic duplex connector, and a prior art dust cover.
Figure 2:
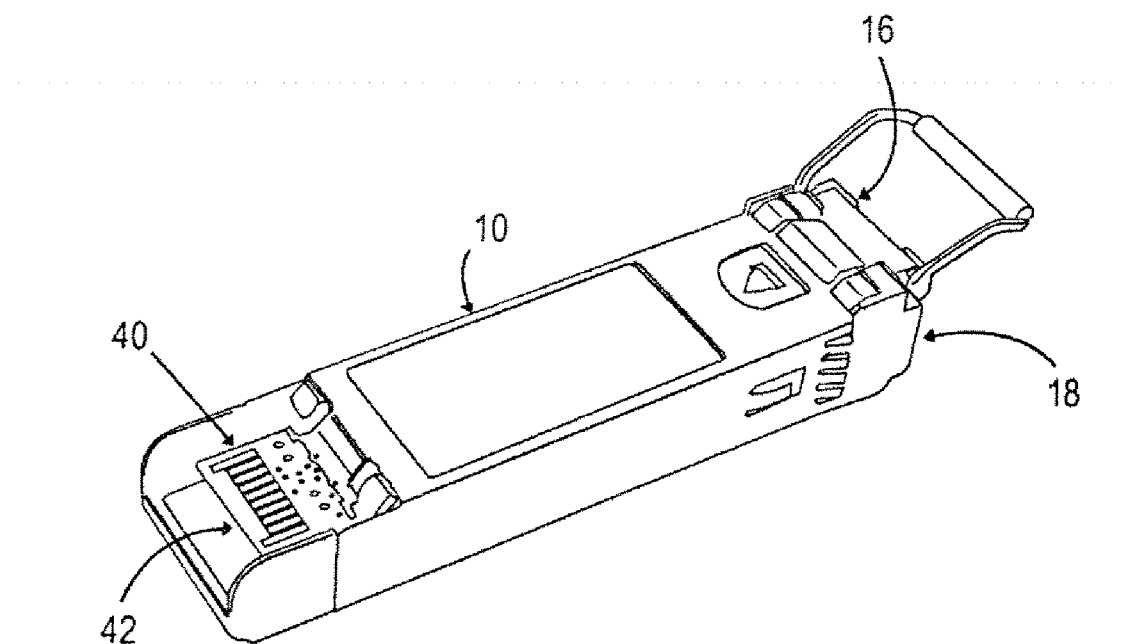
FIG. 2 shows a prior art transceiver.
Figure 3:
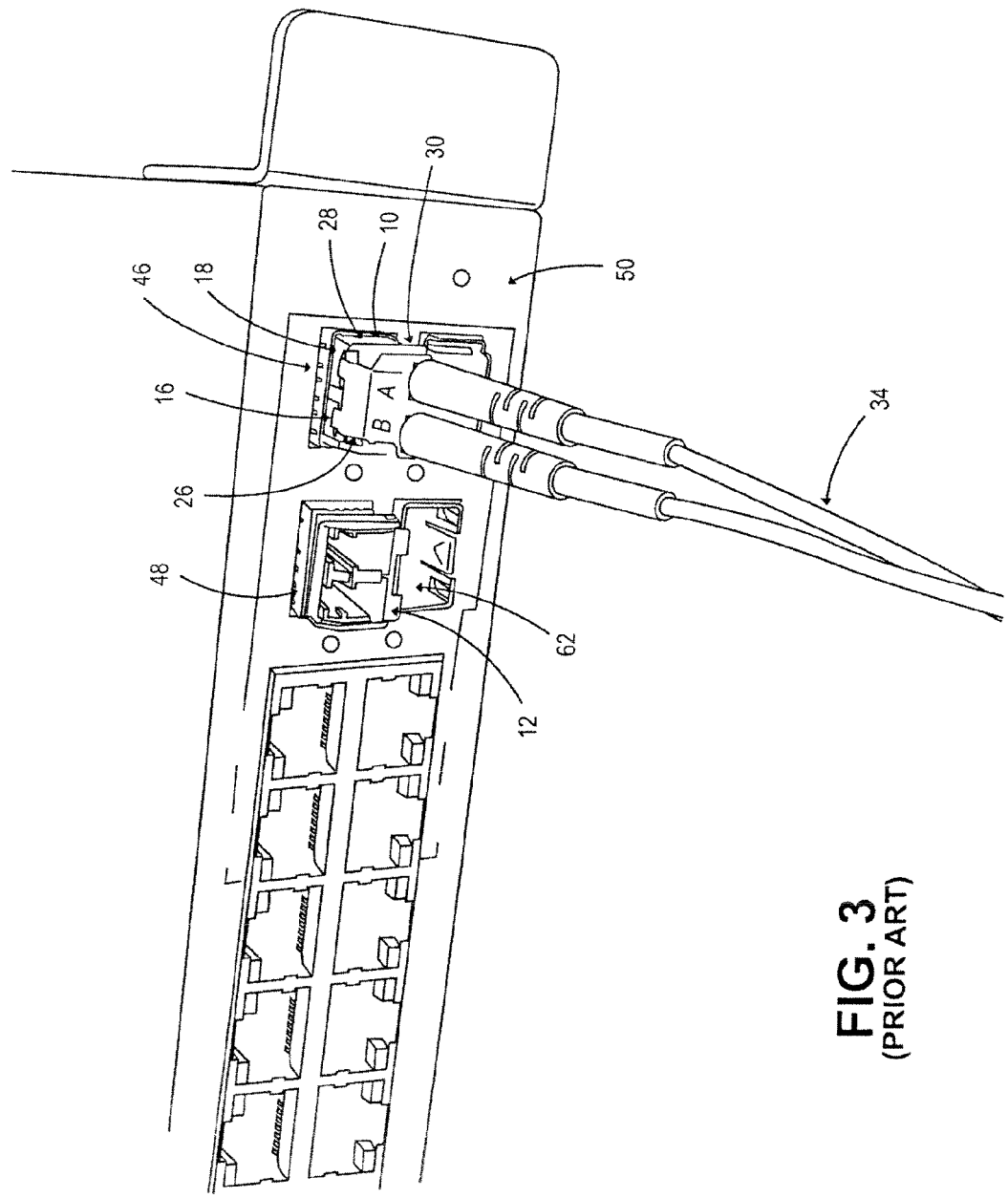
FIG. 3 illustrates a prior art communications switch into which is inserted prior art transceivers and a prior art duplex connector.
Figure 4:
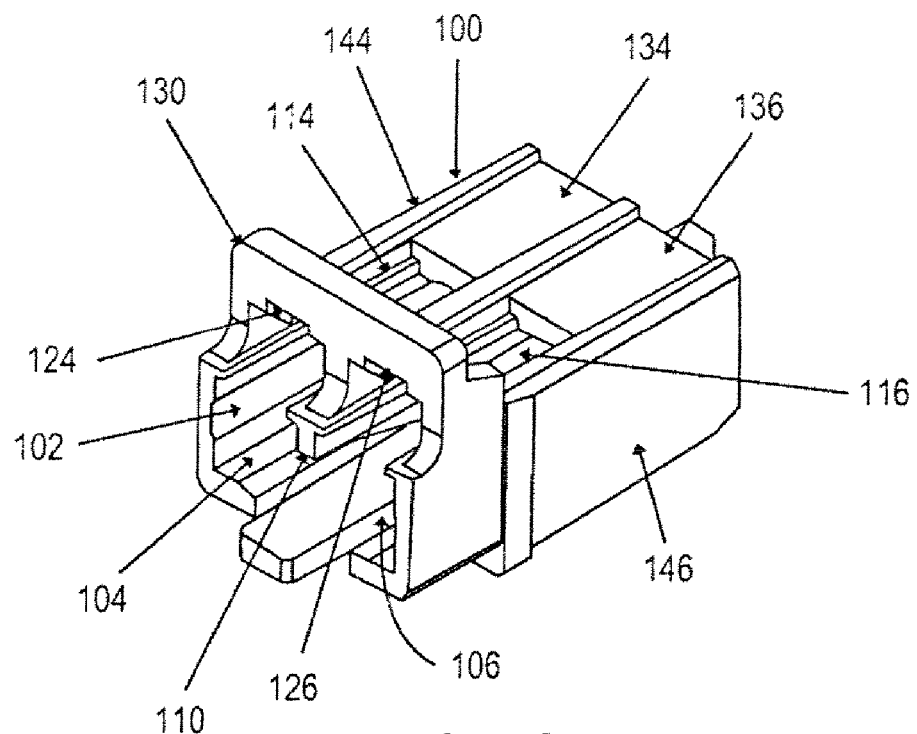
FIG. 4 is a perspective view of a dust cover showing the front, top, and right side.

FIG. 4 is a perspective view of dust cover 100. For one embodiment of the invention, the dust cover is made of plastic. For alternative embodiments, dust cover 100 can be constructed of metal, fiberglass, or other materials.

Dust cover 100 includes an opening 102. Opening 102 is large enough to receive two fiber optic connectors. For one embodiment, opening 102 accommodates simplex LC fiber optic connectors, which are also referred to as LC fiber optic terminations or LC fiber optic patches. Alternatively, opening 102 can accommodate or receive a duplex LC fiber optic connector, which is comprised of two fiber optic terminations coupled together.

For an alternative embodiment, opening 102 can be designed to be large enough to receive two simplex SC fiber optic connectors or an SC duplex fiber optic connector.

For yet other embodiments, opening 102 can be designed to receive another type of connectors, including one or more electrical connectors, such as, for example a telephone plug or a Category 6 electrical connector.

The connectors that are inserted into opening 102 are connected to respective communications cabling. For example, LC fiber optic connectors or SC fiber optic connectors would be coupled to fiber optic cabling. Electrical connectors would be coupled to corresponding electrical cabling. For example, a Category 6 electrical connector would be coupled to a Category 6 cable that has wires.

Simplex fiber optic connectors would each be coupled to separate fiber optic cables. A duplex fiber optic connector would be coupled to two fiber optic cables.

For one embodiment of the invention, dust cover 100 is made from ABS plastic. For one type of embodiment, dust cover 100 can be made in different colors. For example, dust cover 100 can be orange. For other embodiments, dust cover 100 can be various other colors. Having multiple dust covers like dust cover 100 with various colors can be useful in organizing fiber optic cables. Dust covers of certain colors can be associated with particular cables or ports.

For various embodiments, dust cover 100 can include markings, letters, or numbers in order to help with organizing fiber optic cables or identifying communications ports.

One fiber optic connector would be inserted into side 104 of opening 102. The other fiber optic connector would be inserted into side 106 of opening 102. Separation piece 110 helps to guide and separate the two connectors inserted into opening 102.

The upper latches on the fiber optic connectors inserted into opening 102 are pressed down by the portions 124 and 126 of thumb grip 130 as the fiber optic connectors are inserted into dust cover 100. As the fiber connectors are inserted into dust cover 100, the latches of the fiber connectors pop up to enter respective openings 114 and 116. This causes the fiber optic connectors to be latched or secured within dust cover 100. This is because the latches press against thumb cover 130 if one attempts to remove the fiber optic connectors from dust cover 100 by simply pulling the fiber optic connectors outward from dust cover 100. Thus, openings 114 and 116, by receiving the latches of the fiber optic connectors, serve to keep the fiber optic connectors parked securely within dust cover 100.

To remove the fiber optic connectors from dust cover 100, one needs to press down the latches of the fiber optic connectors and pull the connectors from dust cover 100. This allows the latches from the fiber optic connectors to clear the portions 124 and 126 of thumb grip 130.

Figure 5:
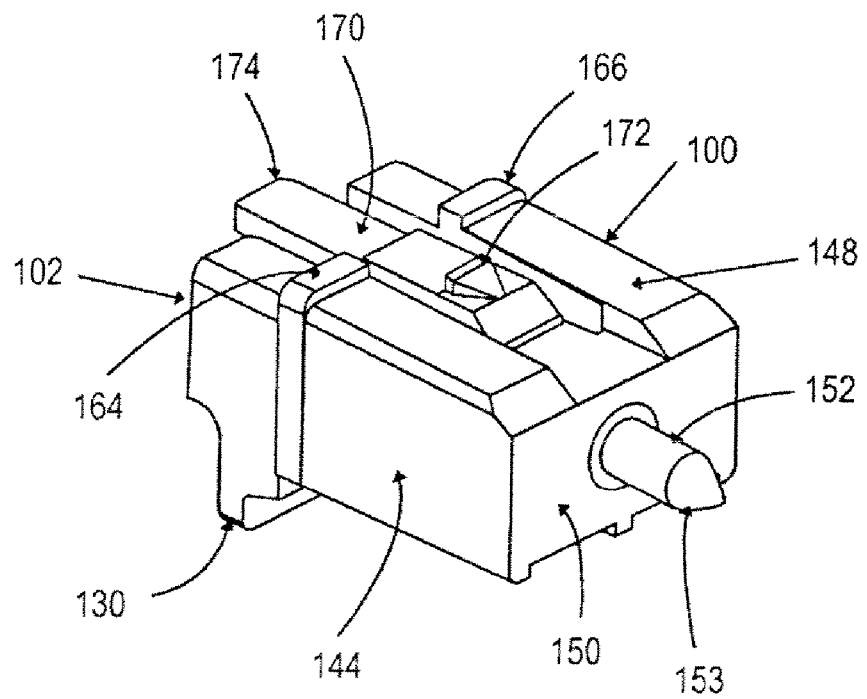
FIG. 5 is a perspective view of the dust cover showing the back, bottom, and left side.

FIG. 5 shows the dust cover 100 turned upside down in a perspective view. FIG. 5 shows the back 150 of dust cover 100, the side 144, and the bottom 148 of dust cover 100.

The covers 134 and 136, the sides 144 and 146, the bottom 148, and the back 150 of dust cover 100 shown in FIGS. 4 and 5 surround the ends of the fiber optic connectors inserted into dust cover 100.

Dust cover 100 includes an ultrasonic staking post 152. Staking post 152 is a cylindrical plastic protruberence that fits within a cylindrical opening at the end of SFP cage or opening within a telecommunications switch. Staking post 152 has a pointed end 153.

Dust cover 100 includes ridges 164 and 166 that press against an SFP cage opening when dust cover 100 is inserted into an SFP cage. In other words, ridges 164 and 166 provide a stop.

Dust cover 100 includes a moveable latch 170, also referred to as eject latch 170 or ejection latch 170. Moveable latch 170 includes a V-shaped ridge 172 that fits within a recess or opening in an SFP cage into which the dust cover 100 is inserted. Ridge 172 is also referred to as retaining latch 172.

Inserting fiber optic connectors into opening 102 causes those connectors to push against end 174 of eject latch 170. Latch 170 pivots and is rotatable. Inserting fiber optic connectors into opening 102 causes the rotatable eject latch 170 to pivot ridge 172 outward from the dust cover 100. Retaining latch 172 thus becomes engaged against the SFP cage within telecommunications switch and inserted into any opening or hole of the SFP cage. This helps to prevent the dust cover 100 from being removed from the SFP cage.

To remove the dust cover 100 from the SFP cage, one needs to pivot eject latch 170 by using handle 174 of latch 170 in order to disengage retaining latch 172 from the SFP cage. But the fiber connectors press against handle 174 of latch 170. To be able to move handle 174, one needs to remove the fiber optic connectors that were recently inserted in opening 102. Thus, dust cover 100 only allows removal of dust cover 100 if both fiber connectors have been removed from opening 102 of dust cover 100.

Dust cover 100 includes a thumb grip 130 that is offset from ridges 164 and 166. Thumb grip 130 allows a user to grasp the dust cover 100 and pull dust cover 100 out of an SFP cage of a telecommunications switch.

FIG. 6 shows a top view of dust cover 100. FIG. 6 shows the full extent of the openings 114 and 116 in the top of dust cover 100. FIG. 6 also shows the grasp handle 174 of lower eject latch 170 of dust cover 100.

FIG. 7 shows the front of dust cover 100. Opening 102 is clearly visible, with left portion 104 for accommodating a simplex fiber optic connector and right portion 106 for accommodating a separate simplex fiber optic connector. Alternatively, portions 104 and 106 can together receive a duplex fiber optic connector. FIG. 7 also shows extension or ridge 172 that is used to secure the dust cover 100 in an SFP cage of a telecommunications switch.

FIG. 8 shows a right side view of dust cover 100. FIG. 8 highlights the lower extension 166 that acts as a stop against the SFP cage of the telecommunications switch. FIG. 8 also shows the thumb grip 130 and how far it extends above the dust cover 100. FIG. 8 also shows the grasp handle 174 of lower latch 170. Also shown in FIG. 8 is the ultrasonic staking post 152 with the pointed end 153.

FIG. 9 shows the back view of dust cover 100 showing back end 150. FIG. 9 shows the cutouts 124 and 126 of thumb grip 130. FIG. 9 also shows retaining latch 172 or eject latch 170.

Figure 10:
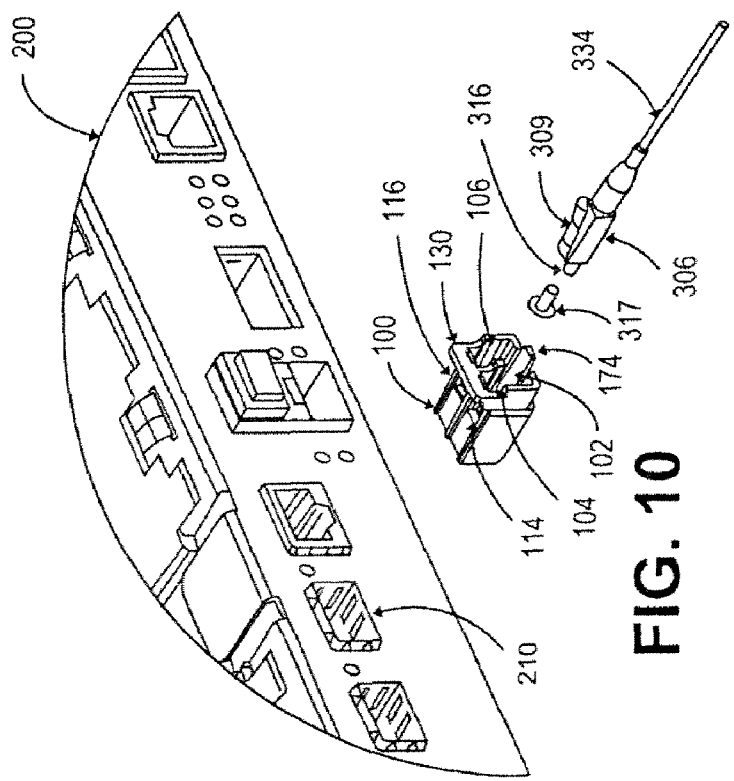
FIG. 10 shows the dust cover and a simplex LC fiber optic connector prior to insertion into an SFP cage of a communications switch.

FIG. 10 shows telecommunications switch 200, dust cover 100, and a simplex LC fiber optic connector 306. For one embodiment, switch 200 is a fiber optic switch for telecommunication or data communication applications. For alternative embodiments, switch 200 can be a router, cable modem, telephone switch, personal computer, blade server, electrical switch, etc.

Communications switch 200 includes an SFP cage 210 within an unused port or inactive opening. SFP cage 210 is considered to be unused given that there is no SFP compact optical transceiver 10 plugged into SFP cage 210.

When no SFP transceiver 10 is plugged into SFP cage 210, it is possible that dust or debris can accumulate in SFP cage 210. This could cause a problem given that an SFP transceiver might be plugged into SFP cage 210 at a later date. The dust and debris in SFP cage 210 could interfere with and hinder an electrical connection made at the end of SFP transceiver 10 at the end of SFP cage 210. The insertion of dust cover 100 into SFP cage 210 helps to prevent the accumulation of dust or debris within SFP cage 210.

Dust cover 100, when inserted into SFP cage 210, also provides a parking spot or retention spot for simplex or duplex fiber optic connectors or other types of connectors.

This is useful because parking those fiber optic connectors in dust cover 100 provides a resting place near telecommunications switch 200 for those fiber optic connectors and their respective cables.

Simplex fiber optic LC connector 306 can be inserted into opening 102 of dust cover 100. Simplex connector 306 can either be inserted into side 104 or side 106 of opening 102.

The latch portion 309 of simplex LC fiber optic connector 306 slides under thumb grip 130 and snaps into either opening 114 or opening 116 of dust cover 100, depending on whether the connector 306 is inserted into side 104 or side 106 of opening 102.

Simplex LC fiber optic connector 306 includes fiber end 316. For one embodiment, a cover can be placed on fiber end 316. Dust cover 100 is deep enough to accommodate simplex fiber optic connector 306 including its fiber end 316 and cover 317. Parking fiber optic connector 306 in dust cover 100 provides protection against damage to the polished fiber end 316 of fiber optic connector 306. The accommodation of a protective cover—such as cover 317—supplied with and used to protect the polished end of a fiber at termination (e.g., an LC or SC fiber optic connector) by dust cover 100 offers increased protection to the polished end (e.g., end 316) of a fiber termination, such as connector 306. This increased protection can help to improve performance and reduce the time necessary for the deployment of new ports.

Fiber connector 306 is connected to fiber optic cable 334. Optical signals can pass through fiber optic cable 334, fiber optic connector 306, and fiber end 316.

Figure 11:
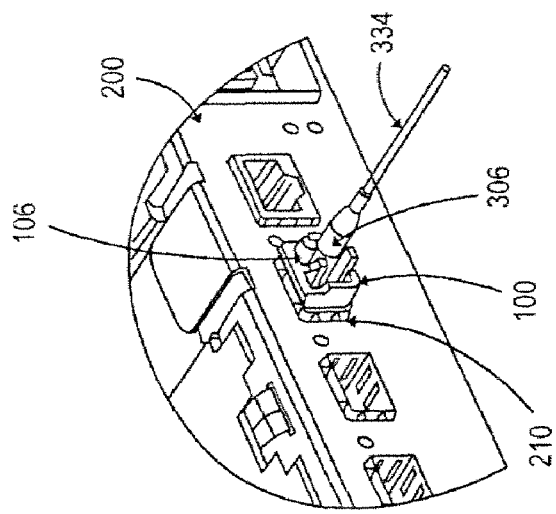
FIG. 11 shows a simplex LC fiber optic connector after insertion into the dust cover and after the dust cover has been inserted into the SFP cage of the communications device.

FIG. 11 shows the parking arrangement wherein fiber optic cable 334 and its connector 306 are parked, or secured, within dust cover 100. Dust cover 100 in turn resides within SFP cage 210 of communications switch 200. For this embodiment, LC simplex fiber connector 306 has been inserted into the right side opening 306 of opening 102 of dust cover 100.

The parking feature shown in FIG. 11 allows fiber optic cables to be installed, dressed, and managed in a telecommunications system prior to turning on ports. This added functionality shown in FIG. 11 helps to reduce the mean time to turn service on. This functionality also protects existing ports from being disturbed by minimizing the disturbance of existing fiber routing.

For one embodiment, the dust covers, such as dust cover 100, can be color coded. That means that various dust covers can have different colors. The different colors can be coded to help to identify cables or ports. The color coding of dust covers allows system administrators to quickly identify unused spare ports within a telecommunications system.

The ability to park fiber optic connectors (coupled to fiber optic cables) in unused SFP cages helps to improve the upgrading and management of telecommunications systems.

For alternative embodiments, other types of connectors besides fiber optic connectors can be parked within dust covers, such as dust cover 100. Those connectors can be electrical connectors, including networking electrical connectors, (such as Category 6 network connectors) and telephone electrical connectors.

In the foregoing specification, reference has been made to specific embodiments of the invention. It will, however, be evident that various modifications and changes may be made thereto without departing from the broader spirit and scope of the invention. The specification and drawings are, accordingly, to be regarded in an illustrative rather than a restrictive sense.

What is claimed is:

1. A cover comprising:

an opening to receive a latch of a pluggable device to secure the pluggable device in the cover;

a retaining latch to hold the cover within an opening of a device, wherein the cover when inserted into the opening of the device provides dust protection for the opening of the device and a parking location for the pluggable device, wherein the cover provides no electrical connection between the pluggable device and the device; and a rotatable eject latch coupled to the retaining latch, wherein the eject latch cannot rotate to remove the cover from the device unless the pluggable device has been removed from the cover.

2. The cover of claim 1, further comprising a staking post externally protruding from the cover to help to secure the cover within the opening of the device.

3. The cover of claim 1, wherein the opening is deep enough to receive a pluggable device having a protective cover on an insertable end of the pluggable device.

4. The cover of claim 1, further comprising an upward protrusion on the cover to allow a user to grasp the cover.

5. The cover of claim 1, wherein the cover has a color that indicates a function of the apparatus.

6. The cover of claim 1, wherein the pluggable device is a fiber optic connector.

7. The cover of claim 1, wherein the pluggable device is an electrical connector.

8. The cover of claim 1, wherein the cover is made of plastic.

9. The cover of claim 1, wherein the opening of the device is an opening of a communications device.

10. An apparatus comprising:

a cover to receive fiber optic connectors, wherein the cover is insertable into a cage of a communication device, wherein the cover provides no electrical connection between the fiber optic connectors and the communication device, and wherein the device the cover includes a receptacle integrated in the cover for receiving protrusions of the fiber optic connectors;

a moveable protrusion to secure the cover in the cage, wherein the movable protrusion will not allow the cover to be removed from the cage unless the fiber optic connectors have been removed from the cover.

11. The apparatus of claim 10, further comprising an external post coupled to the cover to limit movement of the cover within the cage.

12. The apparatus of claim 10, wherein each of the fiber optic connectors includes an end cover.

13. The apparatus of claim 10, further comprising a thumb grip coupled to the cover.

14. The apparatus of claim 10, wherein the fiber optic connectors comprise a duplex connector.

15. The apparatus of claim 10, wherein the fiber optic connectors comprise separate SC connectors.

16. The apparatus of claim 10, wherein the cage comprises a small form-factor pluggable (SFP) cage.

17. A method comprising:
parking a fiber optic connector in a cover by latching the fiber optic connector into the cover;
latching the cover into a cage of a communications device to provide dust protection for the cage, wherein the cover provides no electrical connection between the fiber optic connector and the communications device and wherein when the fiber optic connector is parked in a latched cover, the latched cover cannot be removed from the cage.

18. The method of claim 17, wherein the cover is color-coded to indicate function.

19. The method of claim 17, further comprising:
unlatching the fiber optic connector from the cover and removing the fiber optic connector form the cover;
unlatching the cover and removing the cover from the cage.

20. The method of claim 17, wherein the cage comprises a small form-factor pluggable (SFP) cage.

\* \* \* \* \*

UNITED STATES PATENT AND TRADEMARK OFFICE
Certificate

Patent No. 7,706,657 B1                                  Patented: May 7, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael R. McQuiggan, Goleta, CA (US); and Derek L. Moran, Goleta, CA (US).

Signed and Sealed this Tenth Day of June 2014.

MARK ROBINSON
*Supervisory Patent Examiner*
Art Unit 2883
Technology Center 2800